United States Patent [19]

Binkley et al.

[11] Patent Number: 5,120,474
[45] Date of Patent: Jun. 9, 1992

[54] VALVE-TRAY ASSEMBLY

[75] Inventors: Michael J. Binkley, Glenn Heights; John T. Thorngren, Dallas; Richard P. Lewis, Farmers Branch, all of Tex.; Walter W. Grigson, Baton Rouge, La.

[73] Assignee: Glitsch, Inc., Dallas, Tex.

[21] Appl. No.: 577,360

[22] Filed: Sep. 4, 1990

Related U.S. Application Data

[63] Continuation-in-part of Ser. No. 320,420, Mar. 8, 1989, Pat. No. 4,956,127.

[51] Int. Cl.$^5$ .................................. B01F 3/04
[52] U.S. Cl. .................................. 261/114.4
[58] Field of Search .................................. 261/114.4

[56] References Cited

U.S. PATENT DOCUMENTS

| | | | |
|---|---|---|---|
| 2,582,826 | 1/1952 | Glitsch | 189/34 |
| 2,611,596 | 9/1952 | Glitsch | 261/114 |
| 2,951,691 | 9/1960 | Nutter | 261/114 |
| 2,959,404 | 11/1960 | Eld et al. | 261/114 |
| 3,008,553 | 11/1961 | Glitsch et al. | 189/36 |
| 3,013,782 | 12/1961 | Glitsch | 261/114 |
| 3,019,003 | 1/1962 | Glitsch | 261/114 |
| 3,037,754 | 6/1962 | Glitsch | 261/114 |
| 3,079,134 | 2/1963 | Winn | 261/113 |
| 3,080,155 | 3/1963 | Glitsch et al. | 261/114 |
| 3,087,711 | 4/1963 | Glitsch | 261/114 |
| 3,146,280 | 8/1964 | Forgrieve | 261/114 |
| 3,215,414 | 11/1965 | Van't Sant | 261/114.4 |
| 3,233,708 | 2/1966 | Glitsch et al. | 189/36 |
| 3,245,669 | 4/1966 | Huggins et al. | 261/114 |
| 3,287,004 | 11/1966 | Nutter | 261/114 |
| 3,343,821 | 9/1967 | Winn et al. | 261/112 |
| 3,410,540 | 11/1968 | Bruckert | 261/113 |
| 3,770,255 | 11/1973 | Nutter | 261/114.4 |
| 3,815,880 | 6/1974 | Price | 261/114 VT |
| 3,862,281 | 1/1975 | Uchiyama | 261/114 VT |
| 3,959,419 | 5/1976 | Kitterman | 261/98 |
| 3,969,447 | 7/1976 | Glitsch et al. | 261/111 |
| 4,118,446 | 10/1978 | Burin et al. | 261/114 VT |
| 4,123,008 | 10/1978 | McClain | 239/568 |
| 4,198,002 | 4/1980 | McClain | 239/568 |
| 4,344,900 | 8/1982 | Sonnedecker et al. | 261/114 VT |
| 4,499,035 | 2/1985 | Kirkpatrick et al. | 261/114 JP |
| 4,504,426 | 3/1985 | Chuang et al. | 261/114 R |
| 4,543,219 | 9/1985 | Yamato et al. | 261/109 |
| 4,550,000 | 10/1985 | Bentham | 261/114 R |
| 4,597,916 | 7/1986 | Chen | 261/94 |
| 4,603,022 | 7/1986 | Yoneda et al. | 261/114 R |
| 4,604,247 | 8/1986 | Chen et al. | 261/94 |
| 4,729,857 | 3/1988 | Lee et al. | 261/97 |
| 4,842,778 | 6/1989 | Chen et al. | 261/97 |
| 4,909,967 | 3/1990 | Binkley et al. | 261/97 |
| 4,950,430 | 8/1990 | Chen et al. | 261/112.2 |
| 4,956,127 | 9/1990 | Binkley et al. | 261/114.1 |

FOREIGN PATENT DOCUMENTS

| | | | |
|---|---|---|---|
| 424574 | 4/1974 | U.S.S.R. | 261/114.4 |
| 980743 | 12/1982 | U.S.S.R. | 261/114.4 |

OTHER PUBLICATIONS

Glitsch, Inc., "Ballast Tray Design Manual," Bulletin No. 4900–Fifth Edition, Apr. 1974.

Gilbert Chen, "Packed column internals," *Chemical Engineering*, Mar. 5, 1984 (reprint).

*Primary Examiner*—Tim Miles
*Attorney, Agent, or Firm*—Johnson & Gibbs

[57] ABSTRACT

A valve-tray assembly for vapor liquid contact towers. The active area of the tray beneath an upper downcomer is constructed with directional thrust valves facilitating oriented vapor flow therethrough and improving mass transfer efficiency. The valves include first and second support legs oriented into the liquid flow with the first leg having a wider surface area presented to the flow for diverting the flow therearound. The width of the first leg is less than the diameter of the valve aperture, about which the liquid is induced to flow into engagement with the vapor passing therethrough. The valve assembly is used in conjunction with, and outwardly of, a raised active inlet area to further control initially directed liquid flow from the perforated inlet area beneath the downcomer.

19 Claims, 2 Drawing Sheets

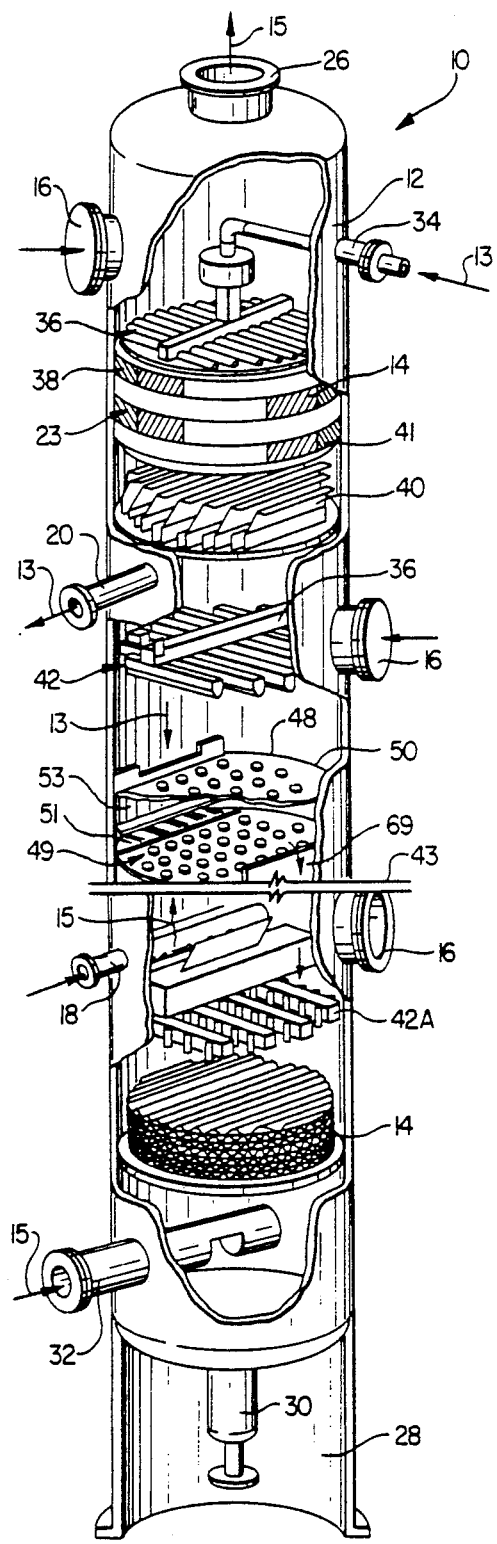

VALVE-TRAY ASSEMBLY

This is a Continuation-in-Part of U.S. patent application Ser. No. 07/320,420 filed Mar. 8, 1989 now U.S. Pat. No. 4,956,127 issued Sept. 11, 1990.

FIELD OF THE INVENTION

The present invention pertains to gas-liquid contacting trays and, more particularly, an improved valve-tray assembly incorporating directional thrust valves and tray construction for higher efficiency operation.

HISTORY OF THE PRIOR ART

Distillation columns are utilized to separate selected components from a multicomponent stream. Generally, such gas-liquid contact columns utilize either trays, packing or combinations thereof. In recent years the trend has been to replace the so-called "bubble caps" by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray, through the "active" area thereof. In this area, liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. The location of the downcomers determines the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray. The present invention specifically addresses the problem of restricted disengagement of vapor retained in the liquid.

A variation for increasing the Bubbling Area and hence vapor/liquid handling capacity is a Multiple Downcomer (MD) tray. There is usually a plurality of box shaped vertical channels installed in a symmetrical pattern across the tray to direct liquid onto and Off Of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of the tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The concentration-difference between the vapor and the liquid can be effected in many ways; some reducing efficiency. For example, as operating pressure increases, descending liquid begins to absorb vapor as it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released otherwise the downcomer can not accommodate the liquid/vapor mixture and will flood, thus preventing successful tower operation. This phenomena is generally deemed to occur when operating pressure is such as to produce a vapor density above about 1.0 lbs/cu. ft. and typically amounts to about 10 to 20% of the vapor by volume. For conventional trays, as shown below, the released vapor must oppose the descending frothy vapor/liquid mixture flowing over the weir into the downcomer. In many cases, such opposition leads to poor tower operation and premature flooding.

The technology of gas-liquid contact addresses many performance issues. Certain performance and design issues are seen in the publication "Ballast Tray Design Manual," Bulletin No. 4900-Fifth Edition by Glitsch, Inc., assignee of the present invention. Other examples are seen in several prior art patents, which include U.S. Pat. No. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances in tray designs improve efficiency within the confines Of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Karl T. Chuang et. al. and assigned to Atomic Energy of Canada Limited is yet another example of gas-liquid contacting apparatus.

Several prior patents have specifically addressed the tray design and the apertures in the active tray deck area itself. For example, U.S. Pat. No. 3,146,280 is a 1964 patent teaching a directional float valve. The vapor is induced to discharge from the inclined valve in a predefined direction depending on the orientation of the valve in the tray deck. Such valve configurations are often designed for particular applications and flow characteristics. Tray valves with weighted sides and various shapes have thus found widespread acceptance in the prior art. A circular valve structure is shown in U.S. Pat. No. 3,287,004 while a rectangular valve structure is shown in U.S. Pat. No. 2,951,691. Both of these patents issuing to I. E. Nutter, teach specific aspects of vapor liquid contact flow utilizing tray valve systems. Such specialized designs are necessary because vapor-liquid flow problems must be considered for each application in Which a tray is fed by a downcomer. The type of directional flow valve, its orientation, and its predisposition to vapor-liquid flow interaction are some of the issues addressed by the present invention.

It would be an advantage to provide a method of and apparatus for enhanced vapor liquid flow manifesting increased efficiency with a directional thrust valve assembly. Such a valve tray assembly is provided by the present invention wherein a circular tray valve is supported by first and second support legs, oriented into the liquid flow of the tray with the first leg having a wider surface area presented to the flow for diverting the flow therearound. The width of the first leg is substantially less than the diameter of the circular valve aperture, about which the liquid is induced to flow into engagement with the vapor passing therethrough. This valve assembly, when used in conjunction with, and outwardly of, a raised active inlet area further controls initially directed liquid flow from the active inlet area beneath the downcomer.

SUMMARY OF THE INVENTION

The present invention relates to gas-liquid contacting trays and improvements in valve-tray assemblies. More particularly, one aspect of the invention includes an improved tray valve assembly for a process column of the type wherein liquid flows downwardly from a downcomer onto a first tray and thereacross in a first direction upon the active area thereof through which vapor flows upwardly for interaction and mass transfer with the liquid before passing therefrom. The improvement comprises a plurality of apertures formed in the tray having a valve cover mounted thereon. The valve cover is mounted by first and second legs, the first leg being disposed to intercept the flow of liquid across the tray and being wider than the second leg. The legs are mounted to the tray in outwardly slotted portions thereof for defining the orientation of the valve relative to the liquid flow. A number of valve shapes are contemplated by the present invention. These include oval and triangular valves. The valve also includes means for selectively biasing the rear region of the valve upwardly against the flow of liquid for facilitating initial, directionalized vapor flow therethrough.

In another aspect, the invention includes the above described tray valve being formed of a round disc having the first and second legs depending downwardly therefrom. Each of the legs are formed with outwardly extending flange portions for underlying the tray and locking the disc in a floating relationship relative thereto. The valve aperture is circular in shape and the valve legs are disposed in slotted regions disposed outwardly of the circular aperture to prevent the rotation of the valve plate for maintaining the orientation of the valve leg relative to the tray. The biasing means comprises a detent portion formed on the cover of the valve for preventing the surface thereof from resting flush against the tray surface. This design facilitates the initial passage of vapor through the valve. The valves are also comprised of circular discs mounted in and above circular apertures formed in the active tray area. Certain ones of the valves are oriented for the directional thrust of vapor therethrough in a select orientation that is not parallel to the initial flow of liquid thereacross for imparting a directional thrust to the liquid flow. In this manner, the direction of liquid flow can be effected, which further enhances the effectiveness of a raised active inlet area adapted for the discharge of vapor into the liquid coming from a downcomer for passage onto the valve area.

In another aspect, the invention includes an improved method of mixing vapor with liquid discharged from a downcomer of a process column onto an underlying cross-flow tray with the column having a plurality of trays and downcomers spaced vertically one from the other. The improvement comprises forming the tray with a plurality of directional thrust valves disposed therein, the valves being formed of generally circular disc members disposed above circular apertures formed within the tray. The disc members have first and second legs in support thereof, the first leg being wider than said second leg for directing flow therearound, the first and second legs of the valve are disposed along a line perpendicular to the downcomer and generally parallel to the flow therefrom. The step of forming the disc members includes biasing the frontal end of the disc which first engages the liquid flow downwardly relative to the rear end for facilitating the directional flow of vapor therethrough.

In another aspect of the invention, the method described above includes the step of forming the first and second legs of the valve with flange portions outstanding from the disc and engaging the underside of the tray to prevent the lifting of the valve upwardly therethrough. The circular aperture may be formed with first and second notches therein, the first and second notches receiving the first and second legs therein and preventing the rotation of the disc relative to the tray.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a perspective view of a packed column with various sections cut away for illustrating, diagrammatically, a variety of tower internals and one embodiment of a downcomer-tray assembly constructed in accordance with the principles of the present invention disposed therein;

FIG. 2 is a diagrammatic, side-elevational, cross-sectional view of the improved downcomer-tray assembly of the present invention secured within a process tower and illustrating the flow of liquid and vapor thereacross;

FIG. 3 is a top-plan, diagrammatic view of a prior art tray illustrating problems with the liquid flow thereacross;

DETAILED DESCRIPTION OF THE PREFERRED EMBODIMENT

Figures 4, 5, 6, 7:
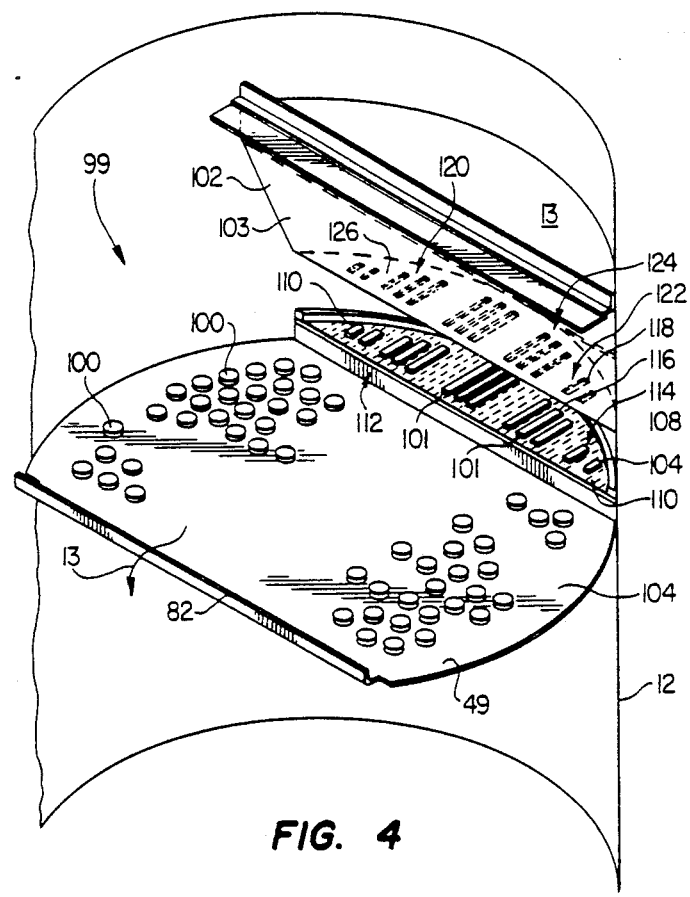
FIG. 4 is a perspective view of the downcomer-tray assembly of the present invention, with portions thereof cut away for purposes of clarity.
FIG. 5 is an enlarged, perspective view of one valve of the tray surface disposed adjacent the downcomer of the present invention.
FIG. 6 is an enlarged, side-elevational, cross-sectional view of the valve structure of FIG. 5.
FIG. 7 is a perspective view of an alternative embodiment of the valve structure of FIG. 5.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays 16 disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Valve trays, comprising the subject matter of the present invention, are herein shown. Such trays comprise plates which are punched or slotted in construction. The vapor and the liquid engage at or along the tray and, in some assemblies, are permitted to flow through the same openings in a counter-current flow arrangement. Optimally, the vapor and liquid flows reach a level of stability. With the utilization of appropriate downcomers, to be described in more detail below, this stability may be achieved with a relatively low flow rate permitting the ascending vapor to mix with the descending liquid. In some embodiments, no downcomers are used and the vapor and the liquid use the same openings, alternating as the respective pressures change. But such is not the case, as shown herein.

In the present embodiment, cross-flow valve trays 48 and 49 and downcomers 53 and 69 are illustrated. Tray 48 is constructed with a plurality of floating valves. Tray 49 also illustrates a raised inlet section 51 beneath downcomer 53, which in accordance with the present invention is substantially planar, formed with a plurality of apertures and which may include a series of momentum deflector barriers, as will be described below. The raised inlet area is described in more detail in U.S. patent application Ser. No. 320,420. Corrosion is another consideration in designing packed towers and for the selection of the material, design, and the fabrication of the tower internals The anatomy of process columns as shown in FIG. 1 is likewise described in more detail in an article by Gilbert Chen, entitled "Packed Column Internals" appearing in the Mar. 5, 1984 edition of *Chemical Engineering,* incorporated herein by reference.

Referring now to FIG. 2, there is shown a side-elevational, cross-sectional, diagrammatic view of the trays 48 and 49 of FIG. 1 and several design aspects of the present invention. An upper tray 48 comprises a first valved panel. The lower tray 49 is also of generally planar construction across its central active area 52, having a plurality of valves 100 mounted therein, as diagrammatically shown. Liquid 13 travels down a downcomer 53 having a tapered or mitered bottom section 54, from tray 48 disposed thereabove. The tapered section 54 of the downcomer provides a clearance angle for vapor flow from the active inlet area, which clearance angle affords a horizontal flow vector to the vapor vented through raised panel 51. The liquid 13 engages vapor 15 discharged from the raised active panel area 51 beneath the downcomer 53.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a mitered region 70 Where the liquid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, Wherein the downcomers and raised, active inlet areas may be positioned in intermediate areas of the trays as also described below. By increasing the total active area by active inlet areas 51 and 71 greater capacity and efficiency is achieved. It is also the manner of flow of the liquid 13 across the tray 49 which, in the present embodiment, is critical to tray efficiency. A flow diagram of a conventional tray will be discussed below for purposes of illustrating the efficiency afforded by the present invention.

Referring now to FIG. 3, there is shown a flow diagram across a conventional tray. The prior art tray 72 is illustrated herein as a round unit having a first conventional downcomer for feeding liquid upon a solid, underlying panel 73 and then to the tray 74. A second downcomer 74A carries liquid away from the tray. A plurality of arrows 75 illustrate the non-uniform flow of liquid 13 typically observed ac ross a conventional prior art tray which does not address the circulation issue. Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced, co-pending patent application Ser. No. 07/304,942, now U.S. Pat. No. 4,956,127 issued Sept. 11, 1990.

Referring now to FIG. 4, there is shown an enlarged, fragmentary perspective view of a downcomer-tray assembly 99 constructed in accordance with the principles of the present invention. Conventional materials such as stainless steel are utilized, as is well known in the art. The tray 49, as shown herein, is also constructed for placement in the tower 12 by conventional means. In the tower, a feeding downcomer 102, having an inclined face 103, is disposed over a raised inlet region 104 for discharging liquid 3 to tray 49. A weir 82 is disposed on the opposite side of tray 49 whereby a second downcomer is disposed for carrying liquid 13 away from the tray 49. Liquid 13 spills down upon active inlet panel 104 and over upstanding edge 106 onto the tray 49.

Still referring to FIG. 4, there is shown the top surface 108 of raised inlet region 104, constructed with a plurality of apertures 110 diagrammatically shown herein and more fully set forth and described in co-pending U.S. patent application Ser. No. 330,420. The apertures 110 are, in certain areas, partially eliminated or blocked off by barrier strips 101, more fully described in co-pending U.S. application Ser. No. 330,420 filed concurrently herewith. Barrier Strips 101 comprise strips of metal (blanking strips tack welded to the surface 108 in defined patterns. The strips 101 comprise momentum barriers and are seen to be provided in groups 112. Particular momentum barrier group 114 is disposed adjacent the edge of the column 12 with an intermediate group 116 disposed inwardly thereof. The strips 01 of group 116 are seen to be substantially longer than those of group 114 as will be discussed in more detail below.

Referring still to FIG. 4, the groups 112 are sized and positioned in a mirror image of the orifices 118 of feeding downcomer 102. The orifices 118 are likewise provided in groups 120 wherein end group 122 is disposed immediately above momentum barrier group 114. Likewise, intermediate group 124 is disposed directly above momentum barrier group 116. The orifices 118, including groups 122 and 124, form the bottom 126 of downcomer 102 in a slotted configuration that is presented to more precisely distribute the liquid flow onto the surface of the tray 49. This feature provides a more uniform flow without the retrograde problem discussed above. By utilizing select groupings of apertures such as elongated slots 118 which are selectively spaced into groups 120, the discharge from downcomer 102 can be selectively designed by those skilled in the art to enhance uniform flow across the float valve tray described herein and reduce back mixing therein. The reduction of back mixing will increase the concentration-difference driving force for mass transfer between the counter flowing streams of gas and liquid. The directional thrust valves 100 of the present invention facilitates this efficiency in operation.

Referring now to FIG. 5, there is shown a single float valve 100 of the array shown in FIG. 4. The valve 100 of the present embodiment is comprised of a circular disc 130 having securement feet 132 and 134 depending therefrom. The valve 100 is mounted within the surface of tray 49 and disposed above an aperture 136 formed therein. The aperture 136 includes a pair of slotted regions 138 and 139 adapted for receiving the legs 132 and 134, respectively. There are multiple advantages in utilizing this type of floating valve. The orientation of the valve relative to the liquid flow is determined by the spacing of the slotted regions 138 and 139 which allows for not only the upward flotation of the circular disc 130 for the passage of vapor therebeneath, but also the secured orientation thereof.

The size of the valve 100 as shown herein is on the order of one inch in diameter. This size has been shown to be effective in the assembly of a tray having an active area with approximately 25–50 valves per square foot. This valve density per square foot is substantially higher than possible with valves of the conventional size of 1½" to 1⅞" in diameter. Prior art valve density on the order of 12–14 valves per square foot has been common. The increased density is a result of the smaller size of valve 100 and its directional thrust design as herein described, which permits it to be spaced close to adjacent valves as shown. The present invention is a marked advance over prior art designs utilizing larger valves and broader spacing. The efficiency of the tray is thought to be enhanced therefrom.

Still referring to FIG. 5, liquid flow 140 is illustrated flowing in the direction of disc 130. As the liquid flow 140 engages the frontal leg number 132, it is seen to split into bi-directional flow 141 traveling around the circumference of the circular aperture 136. Vapor 15 venting beneath circular disc 130 is represented by arrows 142, which arrows illustrate the biased direction that the vapor 15 has in discharge from beneath the disc 130, due to both the frontal leg number 132 as well as the liquid flow 140 and 141 which is engaged thereby. Both the shape of the hole as well as the discharge of vapor 15 therein works in conjunction with the enlarged frontal member 132 to enforce the split flow 141 as described above. In this manner the float valve 100 is effective in reducing the amount of liquid which is back-trapped, or captured, into the aperture 136. The passage of liquid into the aperture 36 is a distinct disadvantage in that such leakage causes the liquid to bypass the remaining active area of the tray deck. It is most advantageous to have a valve structure that limits the amount of liquid flow that is captured within such apertures.

Referring still to FIG. 5, it may further be seen that the select orientation of the valve induces the vapor flow 142 to be in a direction substantially along the path of the liquid flow 140 to help to further promote the directional flow of liquid. This "directional thrust" aspect of the valve is provided due to the size of the frontal leg 38 and the shape of the aperture 136 intersecting liquid flow in direction 40. Such controlled flow aspects may be utilized to further reduce the problem of retrograde liquid flow discussed above. In some situations the orientation of the valve may be slightly angulated relative to the inlet panel 104 for purposes of initiating a degree of directional thrust from the vapor discharge 142. With the present round aperture 136, the frontal leg 132 may also be substantially narrower than if the aperture 136 were rectangular in shape due to the fact that the arcuate shape facilitates the bi-directional liquid flow 141 therearound. In this particular configuration, the frontal leg 132 comprises approximately 30% of the frontal area of the aperture 136 which engages flow 140. With the 30% frontal area of leg 132, and round hole 136, back-trapping is substantially reduced. Moreover, with the tangential flow diversion 141, the degree of turbulence is substantially reduced as compared to a flat barrier structure that would interrupt the liquid flow and produce turbulence therefrom. It should be noted, however, that shapes other than round, or circular valves may also be used.

Referring now to FIG. 6 there is shown the valve 130 of FIG. 5 in a side elevational, cross section view. Frontal leg member 132 is seen to provide a movable barrier for engaging the liquid flow 140 coming from the raised inlet area 104 (not shown). Vapor 15 ascending through the tray deck 49 is exhausted as represented by arrows 42. The escaping vapor 142 interacts immediately with liquid flow 140 and 141, as described above, the latter liquid flow 141 being diverted around the edges of the circular aperture 136. The liquid flow then continues downstream of rear leg 134 as represented by arrow 144. The directional thrust aspect as described above may also be provided in conjunction with the difference in weight between the frontal leg 132 and rear leg 134. The wider frontal leg 132 will, at low vapor flow rates, allow the rear portion of disc 130 to rise upwardly in direction of arrow 134A. This upwardly initiated movement is further facilitated by the detent, or indentation 135 formed adjacent the rear leg 134. The indentation 135 creates a slight bias in the downstream side of the disc 130 to the upward position. This bias creates a slight angulation for the disc 130 in its resting position. The angulated position serves to initiate the upward movement of the rear leg 134 from the resting position and may incorporate a detent 135 on both sides of leg 134. Detents have been used in the prior art to keep valves from sticking to the tray surface. In the present invention the indentation 135 is utilized in conjunction with the particular valve assembly shown herein for select orientation and preferential biasing of the thrust of the directional thrust valve herein described.

Referring now to FIG. 7 there is shown a stationary upstanding aperture cover 146 having the advantages of the two-leg, slotted orientation, wherein the lead leg 148 is wider than the rear leg 148A. In this alternative embodiment of a stationary cover 146, upstream leg 148 is both angulated and permanently formed in active tray section 149 to facilitate the diversion of liquid flow therearound in the direction of arrows 150. The method of formation may include punching, and/or stamping, which is conventional metal forming technology. This figure is provided for purposes of illustrating one alternative form of tray aperture covers that may be incorporated in accordance with the principles of the present invention.

It is thus believed that the operation and construction of the present invention will be apparent from the foregoing description. For the method and apparatus shown or described has been characterized as being preferred it will be obvious that various changes and modifications may be made therein without departing from the spirit and scope of the invention as defined in the following claims.

We claim:

1. An improved tray valve assembly for a process column of the type wherein liquid flows downwardly from a downcomer onto a first tray and thereacross in a first direction upon the active area thereof through which vapor flows upwardly therethrough for interaction and mass transfer with the liquid before passing therefrom, said improvement comprising a plurality of generally circular apertures formed in said tray having a generally round valve plate mounted therein, said valve plate being mounted by first, integrally formed frontal and second, integrally formed rearward legs, said first integrally formed leg being disposed upstream of said second integrally formed leg to form a diverting baffle for directly intercepting the flow of liquid across said tray and being formed of a width which is less than half the diameter of said valve plate while being wider than said second leg to divert said flow therearound, said integrally formed legs extending generally orthogonally downwardly from said valve plate contiguous the outer periphery thereof to comprise an integrally formed depending baffle therewith and being mounted to said tray and in slotted portions thereof for defining the orientation of said valve relative to said liquid flow, and said valve plate including means for selectively biasing said rear region of said valve plate upwardly against the flow of liquid thereover for facilitating initial vapor flow rearwardly therethrough.

2. The apparatus as set forth in claim 1 wherein said legs are each formed with outwardly extending flange portions for underlying said tray and locking said disc in a floating relationship relative thereto.

3. The apparatus as set forth in claim 1 wherein said valves are comprised of circular discs mounted in and above circular apertures formed in said active tray area, certain ones of said valves being oriented for the directional thrust of vapor therethrough in a select orientation that is not parallel to said flow of liquid in said first direction thereacross, for imparting a directional thrust to said liquid flow.

4. The apparatus as set forth in claim 1 wherein said valve structure is disposed outwardly of a raised active inlet area disposed beneath a downcomer, said raised active inlet area being constructed for the discharge of vapor directly into said liquid discharged from said downcomer for passage onto said valve structure.

5. The apparatus as set forth in claim 1 wherein said first leg is arcuate in shape for diverting the flow of liquid on opposite sides thereof.

6. The apparatus as set forth in claim 1 wherein said valve is comprised of a circular disc having a diameter on the order of one inch.

7. The apparatus as set forth in claim 1 wherein said biasing means includes at least one detent formed on the valve plate of said valve adjacent said second leg for preventing the surface thereof from engaging the tray surface, forming a space between the tray surface and the underlying surface of said valve, and imparting an angle thereto to facilitate the initial passage of vapor therethrough.

8. The apparatus as set forth in claim 7 wherein said biasing means includes a dent formed on both sides of said valve plate adjacent said second leg.

9. An improved method of mixing vapor with liquid discharged from a downcomer of a process column onto an underlying cross-flow tray with said column having a plurality of trays and downcomers spaced vertically one from the other, and maintaining liquid vapor flows stability therein, wherein the improvement comprises the steps of:

forming said tray with a plurality of round apertures having two diametrically opposed outwardly extending slotted areas on the tray and extending therethrough;

providing a plurality of float valves disposed therein;

forming said float valves in a generally circular shape with diametrically opposed integrally formed legs to comprise disc members disposed above said apertures formed within said tray;

installing said disc members into said tray with first upstream and second downstream legs positioned in said slotted areas in support thereof;

forming said first leg wider than said second leg but less than one half the diameter of said disc members;

disposing said first and second legs along a line perpendicular to said downcomer; biasing said second leg upwardly relative to said tray; and passing liquid over said valves while passing vapor upwardly therethrough.

10. The method as set forth in claim 9 and further including the step of forming said disc valve with said frontal leg heavier than said rear leg for facilitating the lifting of said second leg before said first leg during said passage of vapor therethrough.

11. The method as set forth in claim 9 and further including the step of forming said first and second legs with flange portions outstanding from said disc and engaging an underside of said tray with said flange portions to prevent the lifting of said valve upwardly therethrough.

12. The method as set forth in claim 9 and further including the step of orienting said valves with said first leg aligned for facing the flow of liquid from said downcomer and diverting said flow around said round aperture.

13. The method as set forth in claim 9 wherein said step of forming said first leg includes forming said first leg in an arcuate shape for diverting flow therearound.

14. The method as set forth in claim 9 wherein said step of passing liquid over said valves includes the steps of providing a raised active inlet area beneath said downcomer and discharging vapor and liquid therefrom.

15. The method as set forth in claim 9 and including the step of forming said disc members in a size on the order of one inch in diameter.

16. The method as set forth in claim 9 wherein said step of biasing said valve upwardly includes the step of forming at least one detent on a surface thereof adjacent said second leg to prevent said surface from resting against said tray and imparting an upwardly biasing force with said vapor to facilitate the initial flow of vapor therethrough.

17. The method as set forth in claim 16 wherein said step of forming a detent includes the step of forming two detents on said surface on opposite sides of said second leg.

18. An improved method of assembling a valve structure in a process column of the type wherein liquid flows downwardly through a first downcomer and is discharged along a notional plane onto a first tray and across the active area thereof through which vapor flows upwardly for interaction and mass transfer with the liquid before passing therefrom by a second downcomer, said improvement comprising the steps of constructing said valve apertures in said tray active area with a generally circular shape on the order of one inch in diameter with diametrically opposed slotted areas extending therefrom and disposing a circular disc of substantially the same size thereabove, mounting said circular disc upon said aperture with first and second internally formed legs disposed on opposite sides thereof, providing said first leg of said disc with a wider surface than said second leg but less than one half the diameter of said disc, disposing said first leg in said aperture in a slotted area thereof to intercept the flow of liquid across said tray from said downcomer for discharging a directional thrust of vapor through said valve outwardly into the liquid in a directional manner facilitating the flow of liquid around said aperture.

19. The method as set forth in claim 18 wherein said step of forming said valve includes forming a float valve having first and second legs, said first and second legs being disposed within said aperture for rectilinear motion therewithin for lifting and the falling of said disc.

* * * * *

UNITED STATES PATENT AND TRADEMARK OFFICE
CERTIFICATE OF CORRECTION

PATENT NO. : 5,120,474

DATED : June 9, 1992

INVENTOR(S) : Michael J. Binkley, John T. Thorngren, Richard P. Lewis & Walter W. Grigson It is certified that error appears in the above-identified patent and that said Letters Patent is hereby corrected as shown below:

| | |
|---|---|
| column 2, line 14 | delete "Off Of"<br>insert --off of-- |
| column 2, line 29 | after surface, insert --.-- |
| column 3, line 44 | delete "Of"<br>insert --of-- |
| column 4, line 4 | delete "Which"<br>insert --which-- |
| column 7, line 46 | delete "Where"<br>insert --where-- |
| column 7, line 54 | delete "Wherein"<br>insert --wherein-- |
| column 8, line 3 | delete "ac ross"<br>insert --across-- |
| column 8, line 34 | delete "3"<br>insert --13-- |
| column 8, line 49 | insert --)--before tack |
| column 8, line 55 | delete "01"<br>insert --101-- |

UNITED STATES PATENT AND TRADEMARK OFFICE
CERTIFICATE OF CORRECTION

PATENT NO. : 5,120,474

Page 2 of 2

DATED : June 9, 1992

INVENTOR(S) : Michael J. Binkley, John T. Thorngren, Richard P. Lewis and Walter W. Grigson It is certified that error appears in the above-identified patent and that said Letters Patent is hereby corrected as shown below:

| | |
|---|---|
| column 10, line 2 | delete "38" insert --138-- |
| column 10, line 3 | delete "40" insert --140-- |
| column 10, line 30 | delete "42" insert --142-- |
| column 11, line 32 | after valve, insert --plate-- |

Signed and Sealed this

Eighteenth Day of January, 1994

Attest:

BRUCE LEHMAN

Attesting Officer

Commissioner of Patents and Trademarks